(12) United States Patent  (10) Patent No.: US 7,393,579 B2
Bermel  (45) Date of Patent: *Jul. 1, 2008

(54) CELLULOSE ACETATE FILMS PREPARED BY COATING METHODS

(75) Inventor: Marcus S. Bermel, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 137 days.

This patent is subject to a terminal disclaimer.

(21) Appl. No.: 11/405,068

(22) Filed: Apr. 17, 2006

(65) Prior Publication Data

US 2006/0188708 A1   Aug. 24, 2006

Related U.S. Application Data

(62) Division of application No. 10/190,181, filed on Jul. 3, 2002, now Pat. No. 7,083,752.

(60) Provisional application No. 60/381,931, filed on May 20, 2002.

(51) Int. Cl.
    B32B 7/02    (2006.01)
    B32B 23/00   (2006.01)
    B32B 23/20   (2006.01)
    B32B 3/10    (2006.01)

(52) U.S. Cl. .................. 428/195.1; 428/339; 428/532; 427/154; 427/384; 427/415

(58) Field of Classification Search ........................ None
See application file for complete search history.

(56) References Cited

U.S. PATENT DOCUMENTS

| 2,173,304 A | 9/1939 | Land et al. |
| 2,237,567 A | 4/1941 | Land |
| 2,445,555 A | 7/1948 | Binda |
| 2,761,791 A | 9/1956 | Russell |
| 3,508,947 A | 4/1970 | Hughes |
| 3,957,514 A | 5/1976 | Adin |
| 4,113,360 A | 9/1978 | Baur et al. |
| 4,327,121 A | 4/1982 | Gray, III |
| 4,348,238 A | 9/1982 | Krall |

(Continued)

FOREIGN PATENT DOCUMENTS

DE   269391   6/1989

(Continued)

OTHER PUBLICATIONS

Japanese Patent Abstract 5-064821.

(Continued)

*Primary Examiner*—Vivian Chen
(74) *Attorney, Agent, or Firm*—Paul A. Leipold; Andrew J. Anderson

(57) ABSTRACT

A method of film fabrication is taught that uses a coating and drying apparatus to fabricate resin films suitable for optical applications. In particular, cellulose acetate films are prepared by simultaneous application of multiple liquid layers to a moving carrier substrate. After solvent removal, the cellulose acetate films are peeled from the sacrificial carrier substrate. Cellulose acetate films prepared by the current invention exhibit good dimensional stability and low birefringence.

9 Claims, 6 Drawing Sheets

U.S. PATENT DOCUMENTS

| | | | |
|---|---|---|---|
| 4,359,510 A | 11/1982 | Taskier | |
| 4,427,741 A | 1/1984 | Aizawa et al. | |
| 4,569,863 A | 2/1986 | Koepke et al. | |
| 4,572,849 A | 2/1986 | Koepke et al. | |
| 4,584,231 A | 4/1986 | Knoop | |
| 4,591,512 A | 5/1986 | Racich et al. | |
| 4,604,425 A | 8/1986 | Ohmura et al. | |
| 4,617,207 A | 10/1986 | Ueki et al. | |
| 4,664,859 A | 5/1987 | Knoop | |
| 4,818,624 A | 4/1989 | Downey, Jr. | |
| 4,895,769 A | 1/1990 | Land et al. | |
| 4,913,760 A | 4/1990 | Benson et al. | |
| 4,952,457 A | 8/1990 | Cartier et al. | |
| 5,219,510 A | 6/1993 | Machell et al. | |
| 5,244,713 A * | 9/1993 | Nakamura et al. | 428/156 |
| 5,256,357 A | 10/1993 | Hayward | |
| 5,366,682 A | 11/1994 | Morikawa et al. | |
| 5,478,518 A | 12/1995 | Taketani et al. | |
| 5,514,466 A | 5/1996 | Yamada et al. | |
| 5,561,180 A | 10/1996 | Taketani et al. | |
| 5,573,842 A | 11/1996 | Gutweiler | |
| 5,611,985 A | 3/1997 | Kobayashi | |
| 5,645,766 A | 7/1997 | Shiro et al. | |
| 5,695,694 A * | 12/1997 | Iwata et al. | 264/1.34 |
| 5,743,980 A | 4/1998 | Hsieh et al. | |
| 5,753,140 A | 5/1998 | Shigemura | |
| 5,759,449 A | 6/1998 | Shiro et al. | |
| 5,771,321 A | 6/1998 | Stern | |
| 5,818,559 A | 10/1998 | Yoshida | |
| 5,909,314 A | 6/1999 | Oka et al. | |
| 5,925,289 A | 7/1999 | Cael et al. | |
| 5,925,769 A | 7/1999 | Connolly et al. | |
| 5,958,305 A | 9/1999 | Shiro et al. | |
| 5,965,321 A | 10/1999 | Taylor, Jr. et al. | |
| 5,973,834 A | 10/1999 | Kadaba et al. | |
| 6,060,183 A * | 5/2000 | Higashi et al. | 428/701 |
| 6,197,989 B1 | 3/2001 | Furukawa et al. | |
| 6,221,496 B1 | 4/2001 | Mori | |
| 6,222,003 B1 | 4/2001 | Hosoi et al. | |
| 6,245,382 B1 | 6/2001 | Shvartsman et al. | |
| 6,262,788 B1 | 7/2001 | Hanrahan et al. | |
| 6,320,042 B1 * | 11/2001 | Michihata et al. | 536/69 |
| 6,476,892 B2 * | 11/2002 | Aminaka | 349/117 |
| 6,512,562 B1 | 1/2003 | Kobayashi et al. | |
| 6,559,912 B2 * | 5/2003 | Aminaka | 349/96 |
| 6,582,789 B1 | 6/2003 | Sumi | |
| 6,623,811 B2 * | 9/2003 | Shibue et al. | 428/1.1 |
| 6,649,104 B2 | 11/2003 | Tadokoro et al. | |
| 6,649,231 B2 * | 11/2003 | Ito | 428/1.3 |
| 6,654,085 B1 | 11/2003 | Koike et al. | |
| 6,731,357 B1 * | 5/2004 | Tachibana et al. | 349/96 |
| 6,814,914 B2 * | 11/2004 | Tasaka et al. | 264/217 |
| 6,844,033 B2 * | 1/2005 | Kobayashi et al. | 428/1.33 |
| 6,897,303 B2 * | 5/2005 | Yamada | 536/58 |
| 6,937,307 B1 * | 8/2005 | Ito et al. | 349/117 |
| 6,958,394 B2 * | 10/2005 | Saito | 536/58 |
| 7,019,130 B2 * | 3/2006 | Ito | 536/69 |
| 7,083,752 B2 * | 8/2006 | Bermel | 264/171.1 |
| 7,182,981 B1 * | 2/2007 | Tachibana et al. | 428/1.1 |
| 2001/0039319 A1 | 11/2001 | Harita et al. | |
| 2002/0001700 A1 | 1/2002 | Sanefuji | |
| 2002/0131172 A1 | 9/2002 | Hayashi et al. | |
| 2002/0150722 A1 | 10/2002 | Suzuki | |
| 2002/0156270 A1 | 10/2002 | Kazama et al. | |
| 2003/0214715 A1 * | 11/2003 | Bermel | 359/485 |
| 2003/0215581 A1 * | 11/2003 | Bermel | 428/1.31 |
| 2003/0215582 A1 * | 11/2003 | Bermel | 428/1.31 |
| 2003/0215583 A1 * | 11/2003 | Bermel | 428/1.31 |
| 2003/0215608 A1 * | 11/2003 | Bermel | 428/141 |
| 2003/0215621 A1 * | 11/2003 | Bermel | 428/212 |
| 2003/0215658 A1 * | 11/2003 | Bermel | 428/500 |
| 2004/0058813 A1 | 3/2004 | Suzuki | |
| 2005/0069711 A1 | 3/2005 | Patel | |

FOREIGN PATENT DOCUMENTS

| | | |
|---|---|---|
| DE | 051090 | 10/1996 |
| EP | 0 154 108 | 9/1985 |
| EP | 0 481 273 | 9/1991 |
| EP | 0 531 568 | 9/1991 |
| EP | 0 531 569 | 9/1991 |
| EP | 0 488 369 | 6/1992 |
| EP | 0 539 099 A2 | 4/1993 |
| EP | 0 656 285 A1 | 6/1995 |
| EP | 0 667 541 A2 | 8/1995 |
| EP | 0 951 057 A1 | 10/1999 |
| JP | 59-047268 | 3/1984 |
| WO | WO 02/33454 * | 4/2002 |

OTHER PUBLICATIONS

Japanese Patent Abstract 63-13100.
Japanese Patent Abstract 9-52240.
Japanese Patent Abstract 61-005986.
Japanese Patent Abstract 2000-047012.
Japanese Patent Abstract 7-186163.
Japanese Patent Abstract 3-252625.
Japanese Patent Abstract 05-059310.
Japanese Patent Abstract 57-059961.
Japanese Patent Abstract 59-047268.
Japanese Patent Abstract 9-216241.
Japanese Patent Abstract 62-229205.
Japanese Patent Abstract 11-254594.
Japanese Patent Abstract 2002-090541.
Japanese Patent Abstract 62-064514.
Japanese Patent Abstract 10-080231.
Japanese Patent Abstract 11-005851.
Surfactants: Static and Dynamic Surface Tension by Y.M. Tricot, "Liquid Film Coating, Scientific Principles and Their Technological Implications", pp. 99-136, Edited by: S.F. Kisler & P.M. Schweizer, Chapman & Hall, 1997.
Solvent film casting-a versatile technology for specialty films, Ulrich Siemann, Luigi Borla, LOFO High Tech Film GmbH, D-79576 Weil am Rhein, Germany, pp. 1-4, Feb. 19, 2001, DRS/bo.
Handbook of Plastics, Elastomers and Composites, CA Harper Editor, McGraw-Hill, Inc. (2000), pp. 6.66-8.

* cited by examiner

CELLULOSE ACETATE FILMS PREPARED BY COATING METHODS

CROSS REFERENCE TO RELATED APPLICATIONS

This is a Divisional of application Ser. No. 10/190,181, filed Jul. 3, 2002 now U.S. Pat. No. 7,083,752, which is a 111A Application of Provisional Application, Ser. No. 60/381,931, filed on May 20, 2002.

FIELD OF THE INVENTION

This invention relates generally to methods for manufacturing resin films and, more particularly, to an improved method for the manufacture of optical films, and most particularly, to the manufacture of cellulose acetate films used as substrates, compensation plates, and protective covers in optical devices such as light filters, liquid crystal displays and other electronic displays.

BACKGROUND OF THE INVENTION

Cellulose acetate has historically been used as a support material in the manufacture of photographic films. In particular, cellulose acetate films are known to have many desirable properties necessary for a photographic film base including high transparency and relatively good dimensional stability with respect to moisture and temperature. Cellulose acetate also has excellent resistance to degradation by ultraviolet light and does not readily discolor when exposed to light or heat. These attributes have also made cellulose acetate films useful for the fabrication of optical devices. For example, light polarizer plates utilize cellulose acetate films as covers to protect the delicate polarizing film from distortion and damage. In this regard, cellulose acetate films have replaced glass to produce lightweight, flexible polarizer plates. Polarizers having cellulose acetate protective covers are utilized in liquid crystal displays, OLED (organic light emitting diode) displays, and in other electronic displays found in, for example, personal computers, televisions, cell phones, and instrument panels.

Polymers of the cellulose acetate type are commercially available in a variety of molecular weights as well as the degree of acyl substitution of the hyroxyl groups on the cellulose backbone. Of these, the fully substituted polymer, cellulose triacetate (CTA) having a combined acetic acid content of approximately 60% is commonly used to manufacture cellulose acetate films.

In general, resin films are prepared either by melt extrusion methods or by casting methods. Melt extrusion methods involve beating the resin until molten (approximate viscosity on the order of 100,000 cp), and then applying the hot molten polymer to a highly polished metal band or drum with an extrusion die, cooling the film, and finally peeling the film from the metal support. For many reasons, however, films prepared by melt extrusion are generally not suitable for optical applications. Principal among these is the fact that melt extruded films exhibit a high degree of optical birefringence. In the case of highly substituted cellulose acetate, there is the additional problem of melting the polymer. Cellulose triacetate has a very high melting temperature of 270-300° C., and this is above the temperature where decomposition begins. Films have been formed by melt extrusion at lower temperatures by compounding cellulose acetate with various plasticizers as taught in U.S. Pat. No. 5,219,510 to Macbell. However, the polymers described in U.S. Pat. No. 5,219,510 to Machell are not the fully substituted cellulose triacetate, but rather have a lesser degree of alkyl substitution or have proprionate groups in place of acetate groups. Even so, melt extruded films of cellulose acetate are known to exhibit poor flatness as noted in U.S. Pat. No. 5,753,140 to Shigenmura. For these reasons, melt extrusion methods are generally not practical for fabricating many resin films including cellulose triacetate films used to prepare protective covers and substrates in electronic displays. Rather, casting methods are generally used to manufacture these films.

Resin films for optical applications are manufactured almost exclusively by casting methods. Casting methods involve first dissolving the polymer in an appropriate solvent to form a dope having a high viscosity on the order of 50,000 cp, and then applying the viscous dope to a continuous highly polished metal band or drum through an extrusion die, partially drying the wet film, peeling the partially dried film from the metal support, and conveying the partially dried film through an oven to more completely remove solvent from the film. Cast films typically have a final dry thickness in the range of 40-200 microns. In general, thin films of less than 40 microns are very difficult to produce by casting methods due to the fragility of wet film during the peeling and drying processes. Films having a thickness of greater than 200 microns are also problematic to manufacture due to difficulties associated with the removal of solvent in the final drying step. Although the dissolution and drying steps of the casting method add complexity and expense, cast films generally have better optical properties when compared to films prepared by melt extrusion methods, and problems associated with decomposition at high temperature are avoided.

Examples of optical films prepared by casting methods include: 1.) Cellulose acetate sheets used to prepare light polarizers as disclosed in U.S. Pat. No. 4,895,769 to Land and U.S. Pat. No. 5,925,289 to Cael as well as more recent disclosures in U.S. Patent Application. Serial. no. 2001/0039319 A1 to Harita and U. S. Patent Application. Serial.no. 2002/001700 A1 to Sanefuji, 2.) Cellulose triacetate sheets used for protective covers for light polarizers as disclosed in U.S. Pat. No. 5,695,694 to Iwata, 3.) Polycarbonate sheets used for protective covers for light polarizers or for retardation plates as disclosed in U.S. Pat. No. 5,818,559 to Yoshida and U.S. Pat. Nos. 5,478,518 and 5,561,180 both to Taketani, and 4.) Polyethersulfone sheets used for protective covers for light polarizers or for retardation plates as disclosed in U.S. Pat. Nos. 5,759,449 and 5,958,305 both to Shiro.

Despite the wide use of the casting method to manufacture optical films, there are however, a number of disadvantages to casting technology. One disadvantage is that cast films have significant optical birefringence. Although films prepared by casting methods have lower birefringence when compared to films prepared by melt extrusion methods, birefringence remains objectionably high. For example, cellulose triacetate films prepared by casting methods exhibit in-plane retardation of 7 nanometers (nm) for light in the visible spectrum as disclosed in U.S. Pat. No. 5,695,694 to Iwata. Polycarbonate films prepared by casting methods exhibit in-plane retardation of 17 nm as disclosed in U.S. Pat. Nos. 5,478,518 and 5,561,180 both to Taketani. U. S. Patent Application. Serial No. 2001/0039319 A1 to Harita claims that color irregularities in stretched cellulose acetate sheets are reduced when the difference in retardation between widthwise positions within the film is less than 5 nm in the original unstretched film. For many applications of optical films, low in-plane retardation values are desirable. In particular, values of in-plane retardation of less than 10 nm are preferred.

Birefringence in cast films arises from orientation of polymers during the manufacturing operations. This molecular orientation causes indices of refraction within the plane of the film to be measurably different. In-plane birefringence is the difference between these indices of refraction in perpendicular directions within the plane of the film. The absolute value of birefringence multiplied by the film thickness is defined as in-plane retardation. Therefore, in-plane retardation is a measure of molecular anisotropy within the plane of the film.

During the casting process, molecular orientation may arise from a number of sources including shear of the dope in the die, shear of the dope by the metal support during application, shear of the partially dried film during the peeling step, and shear of the free-standing film during conveyance through the final drying step. These shear forces orient the polymer molecules and ultimately give rise to undesirably high birefringence or retardation values. To minimize shear and obtain the lowest birefringence films, casting processes are typically operated at very low line speeds of 1-15 m/min as disclosed in U.S. Pat. No. 5,695,694 to Iwata. Slower line speeds generally produce the highest quality films.

Another drawback to the casting method is the inability to accurately apply multiple layers. As noted in U.S. Pat. No. 5,256,357 to Hayward, conventional multi-slot casting dies create unacceptably non-uniform films. In particular, line and streak non-uniformity is greater than 5% with prior art devices. Acceptable two layer films may be prepared by employing special die lip designs as taught in U.S. Pat. No. 5,256,357 to Hayward, but the die designs are complex and may be impractical for applying more than two layers simultaneously.

Another drawback to the casting method is the restrictions on the viscosity of the dope. In casting practice, the viscosity of dope is on the order of 50,000 cp. For example, U.S. Pat. No. 5,256,357 to Hayward describes practical casting examples using dopes with a viscosity of 100,000 cp. In general, cast films prepared with lower viscosity dopes are known to produce non-uniform films as noted for example in U.S. Pat. No. 5,695,694 to Iwata. In U.S. Pat. No. 5,695,694 to Iwata, the lowest viscosity dopes used to prepare casting samples are approximately 10,000 cp. At these high viscosity values, however, casting dopes are difficult to filter and degas. While fibers and larger debris may be removed, softer materials such as polymer slugs are more difficult to filter at the high pressures found in dope delivery systems. Particulate and bubble artifacts create conspicuous inclusion defects as well as streaks and may create substantial waste.

In addition, the casting method can be relatively inflexible with respect to product changes. Because casting requires high viscosity dopes, changing product formulations requires extensive down time for cleaning delivery systems to eliminate the possibility of contamination. Particularly problematic are formulation changes involving incompatible polymers and solvents. In fact, formulation changes are so time consuming and expensive with the casting method that most production machines are dedicated exclusively to producing only one film type.

Finally, cast films may exhibit undesirable cockle or wrinkles. Thinner films are especially vulnerable to dimensional artifacts either during the peeling and drying steps of the casting process or during subsequent handling of the film. In particular, the preparation of composite optical plates from resin films requires a lamination process involving application of adhesives, pressure, and high temperatures. Very thin films are difficult to handle during this lamination process without wrinkling. In addition, many cast films may naturally become distorted over time due to the effects of moisture. For optical films, good dimensional stability is necessary during storage as well as during subsequent fabrication of composite optical plates.

SUMMARY OF THE INVENTION

It is therefore an object of the present invention to overcome the limitations of prior art casting methods and provide a new coating method for preparing amorphous cellulose acetate films having very low in-plane birefringence.

It is a further object of the present invention to provide a new method of producing highly uniform cellulose acetate films over a broad range of dry thicknesses.

Yet another object of the present invention is to provide a method of preparing cellulose acetate films by simultaneously applying multiple layers to a moving substrate.

Still another object of the present invention is to provide a new method of preparing cellulose acetate films with improved dimensional stability and handling ability by temporarily adhering the cellulose acetate film to a supporting carrier substrate at least until it is substantially dry and then subsequently separating the carrier substrate from the cellulose acetate film.

Briefly stated, the foregoing and numerous other features, objects and advantages of the present invention will become readily apparent upon review of the detailed description, claims and drawings set forth herein. These features, objects and advantages are accomplished by applying a low viscosity fluid containing cellulose acetate resin onto a moving carrier substrate by a coating method. The cellulose acetate film is not separated from the carrier substrate until the coated film is substantially dry (<10% residual solvent by weight). In fact, the composite structure of cellulose acetate film and carrier substrate may be wound into rolls and stored until needed. Thus, the carrier substrate cradles the cellulose acetate film and protects against shearing forces during conveyance through the drying process. Moreover, because the cellulose acetate film is dry and solid when it is finally peeled from the carrier substrate, there is no shear or orientation of polymer within the film due to the peeling process. As a result, cellulose acetate films prepared by the current invention are remarkably amorphous and exhibit very low in-plane birefringence.

Cellulose acetate films can be made with the method of the present invention having a thickness of about 1 to 500 µm. Very thin cellulose acetate films of less than 40 µm can be easily manufactured at line speeds not possible with prior art methods. The fabrication of very thin films is facilitated by a carrier substrate that supports the wet film through the drying process and eliminates the need to peel the film from a metal band or drum prior to a final drying step as required in the casting methods described in prior art. Rather, the cellulose acetate film is substantially, if not completely, dried before separation from the carrier substrate. In all cases, dried cellulose acetate films have a residual solvent content of less than 10% by weight. Thus, the present invention readily allows for preparation of very delicate thin films not possible with the prior art casting method. In addition, thick films of greater than 40 microns may also be prepared by the method of the present invention. To fabricate thicker films, additional coatings may be applied over a film-substrate composite either in a tandem operation or in an offline process without comprising optical quality. In this way, the method of the present invention overcomes the limitation of solvent removal during the preparation of thicker films since the first applied film is dry before application of a subsequent wet film. Thus, the present invention allows for a broader range of final film thickness than is possible with casting methods.

In the method of the present invention, cellulose acetate films are created by forming a single or, preferably, a multi-layer composite on a slide surface of a coating hopper, the multi-layer composite including a bottom layer of low viscosity, one or more intermediate layers, and an optional top layer containing a surfactant, flowing the multi-layer composite down the slide surface and over a coating lip of the coating hopper, and applying the multi-layer composite to a moving substrate. In particular, the use of the method of the present invention is shown to allow for application of several liquid layers having unique composition. Coating aids and additives may be placed in specific layers to improve film performance or improve manufacturing robustness. For example, multi-layer application allows a surfactant to be placed in the top spreading layer where needed rather than through out the entire wet film. In another example, the concentration of cellulose acetate in the lowermost layer may be adjusted to achieve low viscosity and facilitate high-speed application of the multi-layer composite onto the carrier substrate. Therefore, the present invention provides an advantageous method for the fabrication of multiple layer composite films such as required for certain optical elements or other similar elements.

Wrinkling and cockle artifacts are minimized with the method of the present invention through the use of the carrier substrate. By providing a stiff backing for the cellulose acetate film, the carrier substrate minimizes dimensional distortion of the cellulose acetate film. This is particularly advantageous for handling and processing very thin films of less than about 40 microns. In addition, the restraining nature of the carrier substrate also eliminates the tendency of cellulose acetate films to distort or cockle over time as a result of changes in moisture levels. Thus, the method of the current invention insures that cellulose acetate films are dimensionally stable during preparation and storage as well as during final handling steps necessary for fabrication of optical elements.

In the practice of the method of the present invention it is preferred that the substrate be a discontinuous sheet such as polyethylene terephthalate (PET). The PET carrier substrate may be pretreated with a subbing layer or an electrical discharge device to modify adhesion between the cellulose acetate film and the PET substrate. In particular, a subbing layer or electrical discharge treatment may enhance the adhesion between the film and the substrate, but still allow the film to be subsequently peeled away from the substrate.

Although the present invention is discussed herein with particular reference to a slide bead coating operation, those skilled in the art will understand that the present invention can be advantageously practiced with other coating operations. For example, freestanding films having low in-plane retardation should be achievable single or multiple layer slot die bead coating operations and single or multiple layer curtain coating operations. Moreover, those skilled in the art will recognize that the present invention can be advantageously practiced with alternative carrier substrates. For example, peeling films having low in-plane birefringence should be achievable with other resin supports (e.g. polyethylene naphthalate (PEN), cellulose acetate, polycarbonate, PET), paper supports, resin laminated paper supports, and metal supports (e.g. aluminum). Practical applications of the present invention include the preparation of cellulose acetate sheets used for optical films, polarizer plates, laminate films, release films, photographic films, and packaging films among others. In particular, cellulose acetate sheets prepared by the method of the present invention may be utilized as optical films in the manufacture of electronic displays such as liquid crystal displays. For example, liquid crystal displays are comprised of a number of film elements including polarizer plates, compensation plates and electrode substrates. Polarizer plates are typically a multi-layer composite structure having dichroic film (normally stretched polyvinyl alcohol treated with iodine) with each surface adhered to a protective cover. The cellulose acetate films prepared by the method of the present invention may are suitable as protective covers for polarizer plates. The cellulose acetate films prepared by the method of the present invention may also be suitable for the manufacture of compensation plates and electrode substrates.

The cellulose acetate film produced with the method of the present invention is an optical film. As produced the cellulose acetate film made with the method of the present invention will have a light transmittance of at least about 85 percent, preferably at least about 90 percent, and most preferably, at least about 95 percent. Further, as produced the cellulose acetate film will have a haze value of less than 1.0 percent. In addition, the cellulose acetate films are smooth with a surface roughness average of less than 100 nm and most preferably with a surface roughness of less than 50 nm.

DETAILED DESCRIPTION OF THE INVENTION

Figure 1:
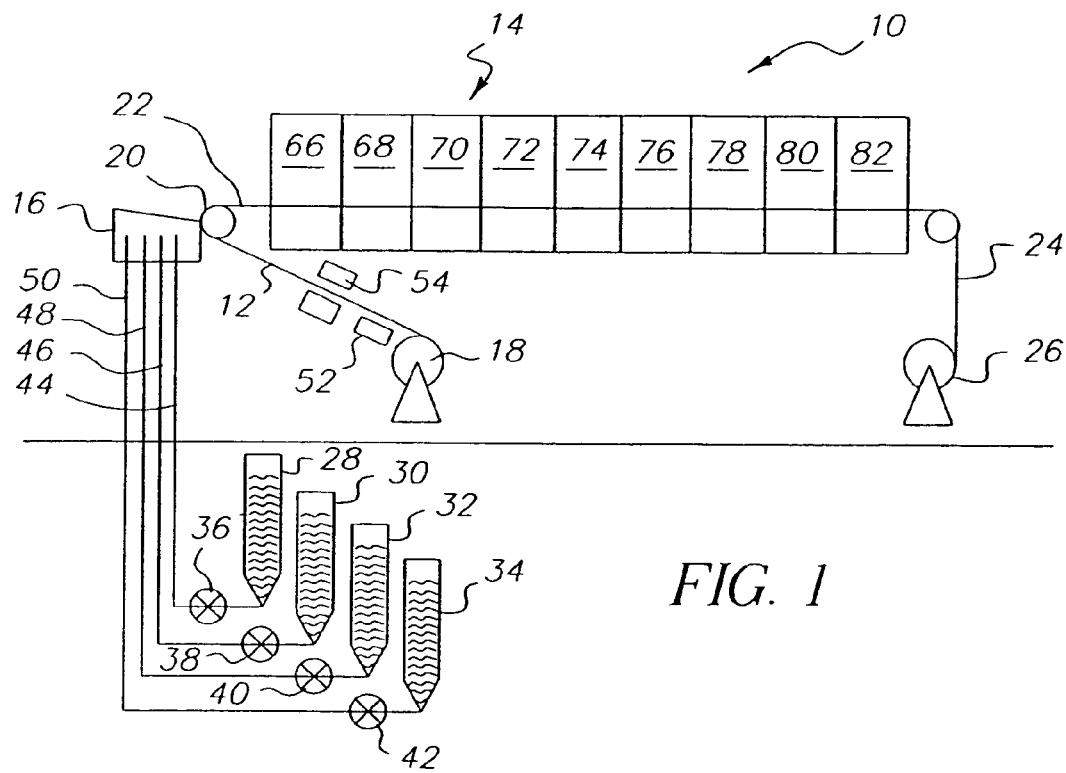
FIG. 1 is a schematic of an exemplary coating and drying apparatus that can be used in the practice of the method of the present invention.

Turning first to FIG. 1 there is shown a schematic of an exemplary and well known coating and drying system 10 suitable for practicing the method of the present invention. The coating and drying system 10 is typically used to apply very thin films to a moving substrate 12 and to subsequently remove solvent in a dryer 14. A single coating apparatus 16 is shown such that system 10 has only one coating application point and only one dryer 14, but two or three (even as many as six) additional coating application points with corresponding drying sections are known in the fabrication of composite thin films. The process of sequential application and drying is known in the art as a tandem coating operation.

Coating and drying apparatus 10 includes an unwinding station 18 to feed the moving substrate 12 around a back-up roller 20 where the coating is applied by coating apparatus 16. The coated web 22 then proceeds through the dryer 14. In the practice of the method of the present invention the final dry film 24 comprising a cellulose acetate film on substrate 12 is wound into rolls at a wind-up station 26.

As depicted, an exemplary four-layer coating is applied to moving web 12. Coating liquid for each layer is held in respective coating supply vessel 28, 30, 32, 34. The coating liquid is delivered by pumps 36, 38, 40, 42 from the coating supply vessels to the coating apparatus 16 conduits 44, 46, 48, 50, respectively. In addition, coating and drying system 10 may also include electrical discharge devices, such as corona or glow discharge device 52, or polar charge assist device 54, to modify the substrate 12 prior to application of the coating.

Figure 2:
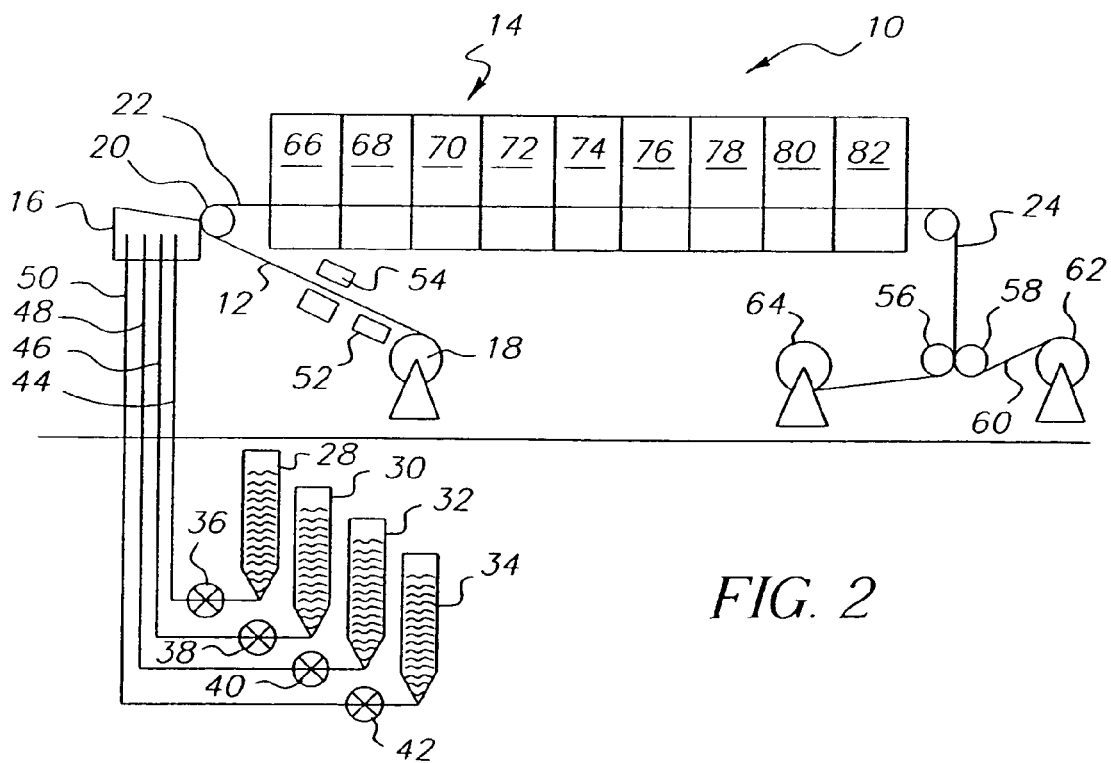
FIG. 2 is a schematic of an exemplary coating and drying apparatus of FIG. 1 including a station where the cellulose acetate web separated from the substrate is separately wound.

Turning next to FIG. 2 there is shown a schematic of the same exemplary coating and drying system 10 depicted in FIG. 1 with an alternative winding operation. Accordingly, the drawings are numbered identically up to the winding operation. In the practice of the method of the present invention the dry film 24 comprising a substrate (which may be a resin film, paper, resin coated paper or metal) with a cellulose acetate coating applied thereto is taken between opposing rollers 56, 58. The cellulose acetate film 60 is peeled from substrate 12 with the cellulose acetate film going to winding station 62 and the substrate 12 going to winding station 64. In a preferred embodiment of the present invention, polyethylene phthalate (PET) is used as the substrate 12. The substrate 12 may be pretreated with a subbing layer to enhance adhesion of the coated film 60 to the substrate 12.

The coating apparatus 16 used to deliver coating fluids to the moving substrate 12 may be a multi-layer applicator such as a slide bead hopper, as taught for example in U.S. Pat. No. 2,761,791 to Russell, or a slide curtain hopper, as taught by U.S. Pat. No. 3,508,947 to Hughes. Alternatively, the coating apparatus 16 may be a single layer applicator, such as slot die bead hopper or jet hopper. In a preferred embodiment of the present invention, the application device 16 is a multi-layer slide bead hopper.

As mentioned above, coating and drying system 10 includes a dryer 14 that will typically be a drying oven to remove solvent from the coated film. An exemplary dryer 14 used in the practice of the method of the present invention includes a first drying section 66 followed by eight additional drying sections 68-82 capable of independent control of temperature and air flow. Although dryer 14 is shown as having nine independent drying sections, drying ovens with fewer compartments are well known and may be used to practice the method of the present invention. In a preferred embodiment of the present invention the dryer 14 has at least two independent drying zones or sections.

Preferably, each of drying sections 68-82 each has independent temperature and airflow controls. In each section, temperature may be adjusted between 5° C. and 150° C. To minimize drying defects from case hardening or skinning-over of the wet cellulose acetate film, optimum drying rates are needed in the early sections of dryer 14. There are a number of artifacts created when temperatures in the early drying zones are inappropriate. For example, fogging or blush of cellulose acetate films is observed when the temperature in zones 66, 68 and 70 are set at 25° C. This blush defect is particularly problematic when high vapor pressures solvents (methylene chloride and acetone) are used in the coating fluids. Aggressively high temperatures of 95° C. in the early drying sections 66, 68, and 70 are found to cause premature delamination of the cellulose acetate film from the carrier substrate. Higher temperatures in the early drying sections are also associated with other artifacts such as case hardening, reticulation patterns and blistering of the cellulose acetate film. In preferred embodiment of the present invention, the first drying section 66 is operated at a temperature of at least about 25° C. but less than 95° C. with no direct air impingement on the wet coating of the coated web 22. In another preferred embodiment of the method of the present invention, drying sections 68 and 70 are also operated at a temperature of at least about 25° C. but less than 95° C. It is preferred that initial drying sections 66, 68 be operated at temperatures between about 30° C. and about 60° C. It is most preferred that initial drying sections 66, 68 be operated at temperatures between about 30° C. and about 50° C. The actual drying temperature in drying sections 66, 68 may optimize empirically within these ranges by those skilled in the art.

Figure 3:
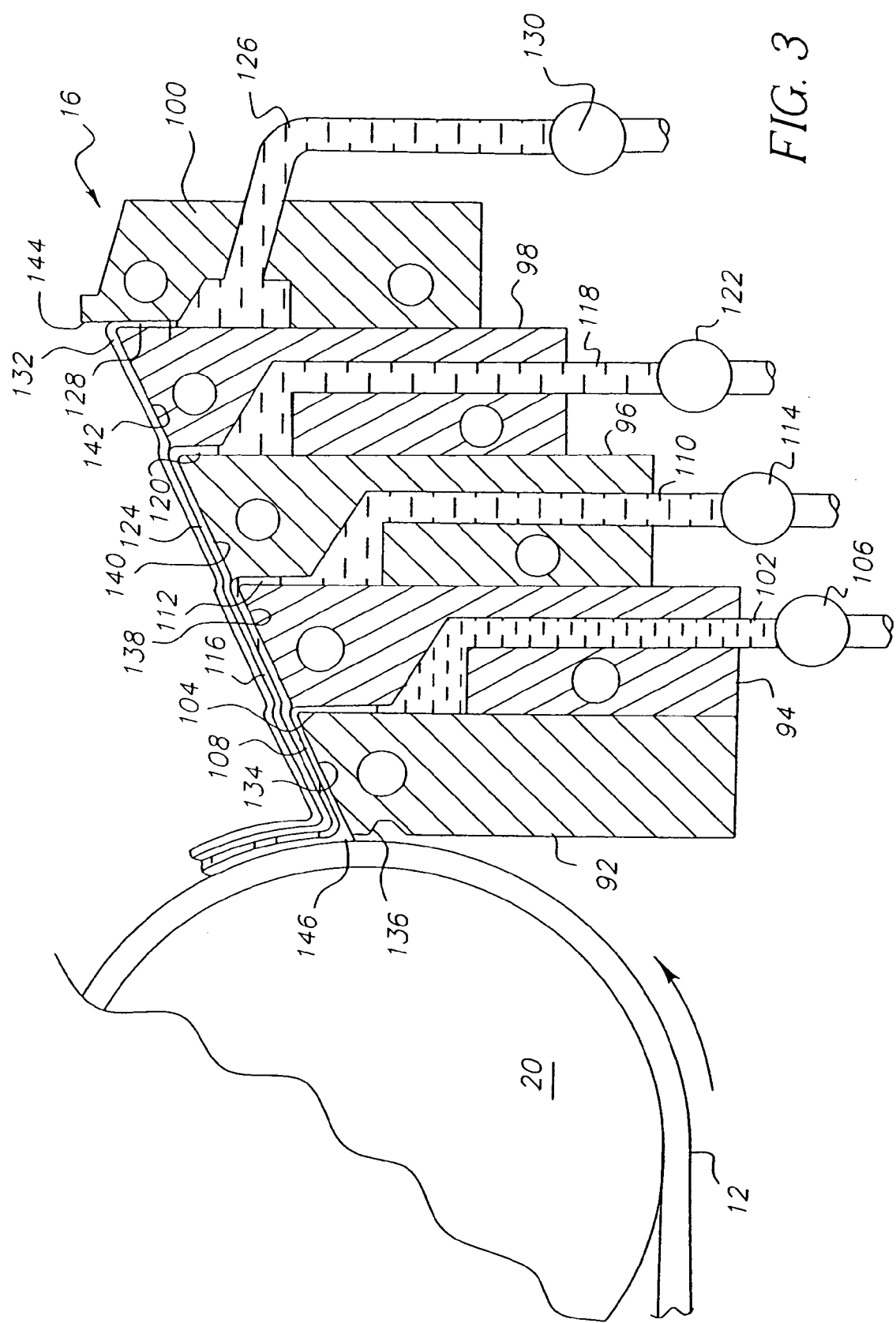
FIG. 3 is a schematic of an exemplary multi-slot coating apparatus that can be used in the practice of the method of the present invention.

Referring now to FIG. 3, a schematic of an exemplary coating apparatus 16 is shown in detail. Coating apparatus 16, schematically shown in side elevational cross-section, includes a front section 92, a second section 94, a third section 96, a fourth section 98, and a back plate 100. There is an inlet 102 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 into back plate 100 for supplying coating liquid to metering slot 128 via pump 130 to form layer 132. Each slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating backing roller 20 about which a web 12 is conveyed. Coating layers 108, 116, 124, 132 form a multi-layer composite which forms a coating bead 146 between lip 136 and substrate 12. Typically, the coating hopper 16 is movable from a non-coating position toward the coating backing roller 20 and into a coating position. Although coating apparatus 16 is shown as having four metering slots, coating dies having a larger number of metering slots (as many as nine or more) are well known and may be used to practice the method of the present invention.

In the method of the present invention, the coating fluids are comprised principally of a cellulose ester dissolved in an organic solvent. Cellulose esters are commercially available in a variety of molecular weight sizes as well as in the type and degree of alkyl substitution of the hydroxyl groups on the cellulose backbone. Examples of cellulose esters include those having acetyl, proprionyl and butyryl groups. Of particular interest is the family of cellulose esters with acetyl substitution known as cellulose acetate. Of these, the fully acetyl substituted cellulose having a combined acetic acid content of approximately 58.0-62.5% is known as cellulose triacetate (CTA) and is generally preferred for preparing protective covers, compensation films, and substrates used in electronic displays.

In terms of organic solvents for cellulose acetate, suitable solvents, for example, include chlorinated solvents (methylene chloride and 1,2 dichloroethane), alcohols (methanol, ethanol, n-propanol, isopropanol, n-butanol, isobutanol, diacetone alcohol and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, n-butyl acetate, and methylacetoacetate), aromatics (toluene and xylenes) and ethers (1,3-dioxolane, 1,2-dioxolane, 1,3-dioxane, 1,4-dioxane, and 1,5-dioxane). In some applications, small amounts of water may be used. Normally, CTA solutions are prepared with a blend of the aforementioned solvents. Preferred primary solvents include methylene chloride, acetone, methyl acetate, and 1,3-dioxolane. Preferred co-solvents include methanol, ethanol, n-butanol and water.

Coating fluids may also contain plasticizers. Appropriate plasticizers for cellulose acetate films include phthalate esters (dimethylphthalate, diethylphthalate, dibutylphthalate, dioctylphthalate, didecylphthalate and butyl octylphthalate), adipate esters (dioctyl adipate), and phosphate esters (tricresyl phosphate and triphenyl phosphate). Plasticizers are normally used to improve the physical and mechanical properties of the final film. In particular, plasticizers are known to improve the flexibility and dimensional stability of cellulose acetate films. However, plasticizers are also used here as coating aids in the converting operation to minimize premature film solidification at the coating hopper and to improve drying characteristics of the wet film. In the method of the present invention, plasticizers are used to minimize blistering, curl and delamination of cellulose acetate films during the drying operation. In a preferred embodiment of the present invention, plasticizers are added to the coating fluid at a total concentration of up to 50% by weight relative to the concentration of polymer in order to mitigate defects in the final cellulose acetate film.

Coating fluids may also contain surfactants as coating aids to control artifacts related to flow after coating. Artifacts created by flow after coating phenomena include mottle, repellencies, orange-peel (Bernard cells), and edge-withdraw. Surfactants used control flow after coating artifacts include siloxane and fluorochemical compounds. Examples of commercially available surfactants of the siloxane type include: 1.) Polydimethylsiloxanes such as DC200 Fluid from Dow Corning, 2.) Poly(dimethyl, methylphenyl)siloxanes such as DC510 Fluid from Dow Corning, and 3.) Polyalkyl substituted polydimethysiloxanes such as DC190 and DC1248 from Dow Coming as well as the L7000 Silwet series (L7000, L7001, L7004 and L7230) from Union Carbide, and 4.) Polyalkyl substituted poly(dimethyl, methylphenyl)siloxanes such as SF1023 from General Electric. Examples of commercially available fluorochemical surfactants include: 1.) Fluorinated alkyl esters such as the Fluorad series (FC430 and FC431) from the 3M Corporation, 2.) Fluorinated polyoxyethylene ethers such as the Zonyl series (FSN, FSN100, FSO, FSO100) from Du Pont, 3.) Acrylate: polyperfluoroalkyl ethylacrylates such as the F series (F270 and F600) from NOF Corporation, and 4.) Perfluoroalkyl derivatives such as the Surflon series (S383, S393, and S8405) from the Asahi Glass Company. In the method of the present invention, surfactants are generally of the non-ionic type. In a preferred embodiment of the present invention, non-ionic compounds of either the siloxane or fluorinated type are added to the uppermost layers.

In terms of surfactant distribution, surfactants are most effective when present in the uppermost layers of the multi-layer coating. In the uppermost layer, the concentration of surfactant is preferably 0.001-1.000% by weight and most preferably 0.010-0.500%. In addition, lesser amounts of surfactant may be used in the second uppermost layer to minimize diffusion of surfactant into the lowermost layers. The concentration of surfactant in the second uppermost layer is preferably 0.000-0.200% by weight and most preferably between 0.000-0.100% by weight. Because surfactants are only necessary in the uppermost layers, the overall amount of surfactant remaining in the final dried film is small. In the method of the present invention, a practical surfactant concentration in the uppermost layer having a wet thickness of 20 µm and a density of 0.93 g/cc is 0.200% by weight which after drying gives a final surfactant amount of approximately 37 mg/sq-m.

Although surfactants are not required to practice the method of the current invention, surfactants do improve the uniformity of the coated film. In particular, mottle nonuniformities are reduced by the use of surfactants. In transparent cellulose acetate films, mottle nonuniformities are not readily visualized during casual inspection. To visualize mottle artifacts, organic dyes may be added to the uppermost layer to add color to the coated film. For these dyed films, nonuniformities are easy to see and quantify. In this way, effective surfactant types and levels may be selected for optimum film uniformity.

Figure 4:
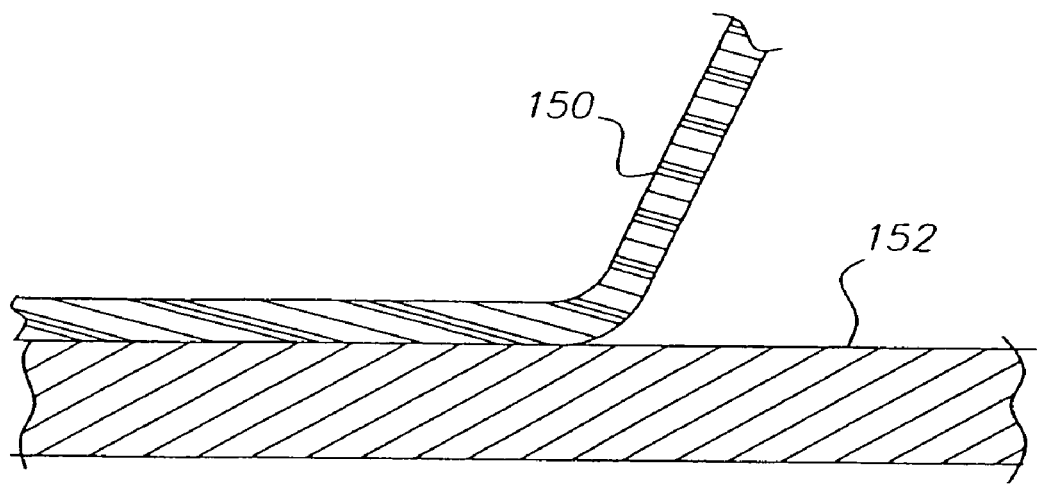
FIG. 4 shows a cross-sectional representation of a single-layer cellulose acetate film partially peeled from a carrier substrate and formed by the method of the present invention.
Figure 5:
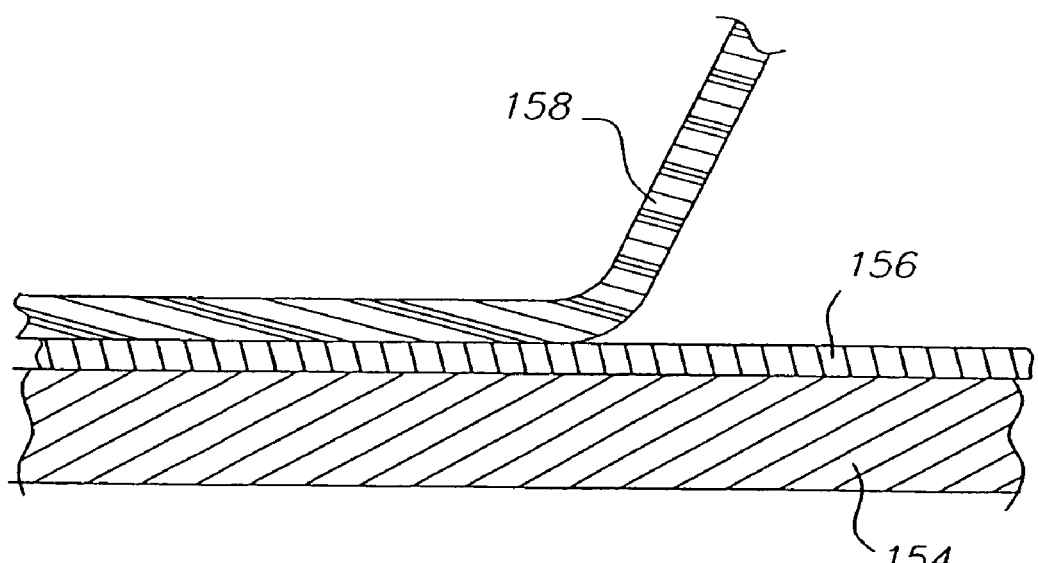
FIG. 5 shows a cross-sectional representation of a single-layer cellulose acetate film partially peeled from a carrier substrate and formed by the method of the present invention wherein the carrier substrate has a subbing layer formed thereon.
Figure 6:
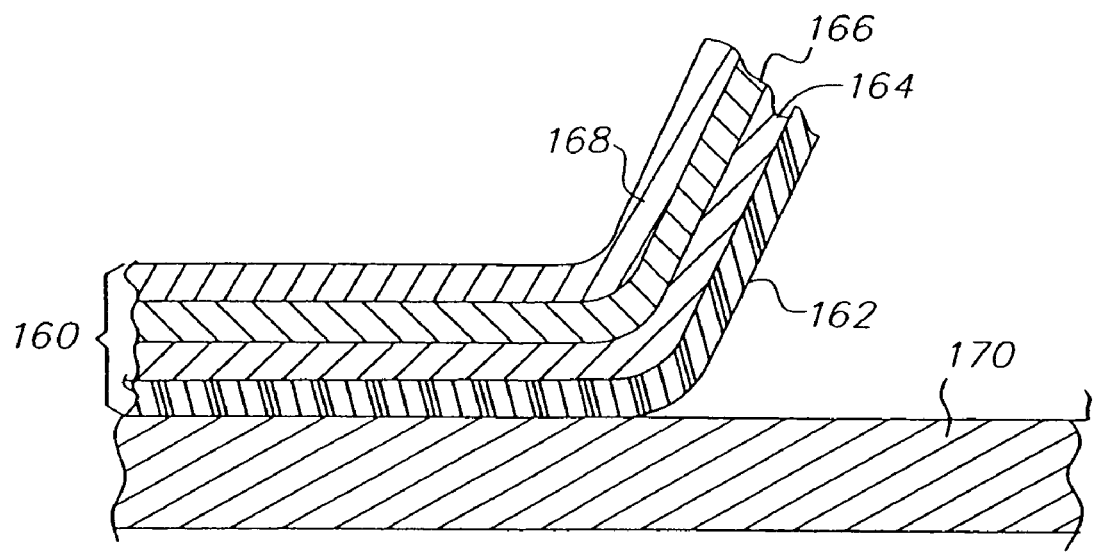
FIG. 6 shows a cross-sectional representation of a multi-layer cellulose acetate film partially peeled from a carrier substrate and formed by the method of the present invention.
Figure 7:
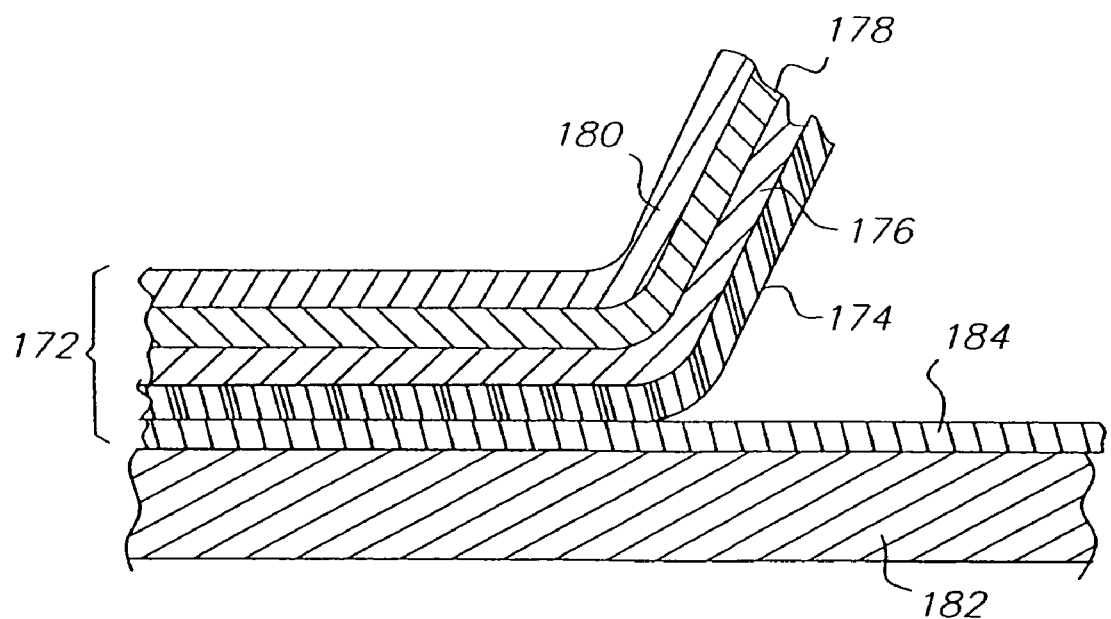
FIG. 7 shows a cross-sectional representation of a multi-layer cellulose acetate film partially peeled from a carrier substrate and formed by the method of the present invention wherein the carrier substrate has a subbing layer formed thereon.

Turning next to FIGS. 4 through 7, there are presented cross-sectional illustrations showing various film configurations prepared by the method of the present invention. In FIG. 4, a single-layer cellulose acetate film 150 is shown partially peeled from a carrier substrate 152. Cellulose acetate film 150 may be formed either by applying a single liquid layer to the carrier substrate 152 or by applying a multiple layer composite having a composition that is substantially the same among the layers. Alternatively in FIG. 5, the carrier substrate 154 may have been pretreated with a subbing layer 156 that modifies the adhesive force between the single layer cellulose acetate film 158 and the substrate 154. FIG. 6 illustrates a multiple layer film 160 that is comprised of four compositionally discrete layers including a lowermost layer 162 nearest to the carrier support 170, two intermediate layers 164, 166, and an uppermost layer 168. FIG. 6 also shows that the entire multiple layer composite 160 may be peeled from the carrier substrate 170. FIG. 7 shows a multiple layer composite film 172 comprising a lowermost layer 174 nearest to the carrier substrate 182, two intermediate layers 176, 178, and an uppermost layer 180 being peeled from the carrier substrate 182. The carrier substrate 182 has been treated with a subbing layer 184 to modify the adhesion between the composite film 172 and substrate 182. Subbing layer 184 may be comprised of a number of polymeric materials such as polyvinylbutyrals, cellulosics, polyacrylates, polycarbonates and poly(acrylonitrile-co-vinylidene chloride-co-acrylic acid). The choice of materials used in the subbing layer may be optimized empirically by those skilled in the art.

The method of the present invention may also include the step of coating over a previously prepared composite of cellulose acetate film and carrier substrate. For example, the coating and drying system 10 shown in FIGS. 1 and 2 may be used to apply a second multi-layer film to an existing cellulose acetate film/substrate composite. If the film/substrate composite is wound into rolls before applying the subsequent coating, the process is called a multi-pass coating operation. If coating and drying operations are carried out sequentially on a machine with multiple coating stations and drying ovens, then the process is called a tandem coating operation. In this way, thick films may be prepared at high line speeds without the problems associated with the removal of large amounts of solvent from a very thick wet film. Moreover, the practice of multi-pass or tandem coating also has the advantage of minimizing other artifacts such as streak severity, mottle severity, and overall film nonuniformity.

The practice of tandem coating or multi-pass coating requires some minimal level of adhesion between the first-pass film and the carrier substrate. In some cases, film/substrate composites having poor adhesion are observed to blister after application of a second or third wet coating in a multi-pass operation. To avoid blister defects, adhesion must be greater than 0.3 N/m between the first-pass cellulose acetate film and the carrier substrate. This level of adhesion may be attained by a variety of web treatments including various subbing layers and various electronic discharge treatments. However, excessive adhesion between the applied film and substrate is also undesirable since the film may be damaged during subsequent peeling operations. In particular, film/substrate composites having an adhesive force of greater than 250 N/m have been found to peel poorly. Films peeled from such excessively well-adhered composites exhibit defects due to tearing of the film and/or due to cohesive failure within the film. In a preferred embodiment of the present invention, the adhesion between the cellulose acetate film and the carrier substrate is less than 250 N/m. Most preferably, the adhesion between polycarbonate film and the carrier substrate is between 0.5 and 25 N/m.

The method of the present invention is suitable for application of resin coatings to a variety of substrates such as polyethylene terephthalate (PET), polyethylene naphthalate (PEN), polycarbonate, polystyrene, and other polymeric films. Additional substrates may include paper, laminates of paper and polymeric films, glass, cloth, aluminum and other metal supports. In some cases, substrates may be pretreated with subbing layers or electrical discharge devices. Substrates may also be pretreated with functional layers containing various binders and addenda.

Figure 8:
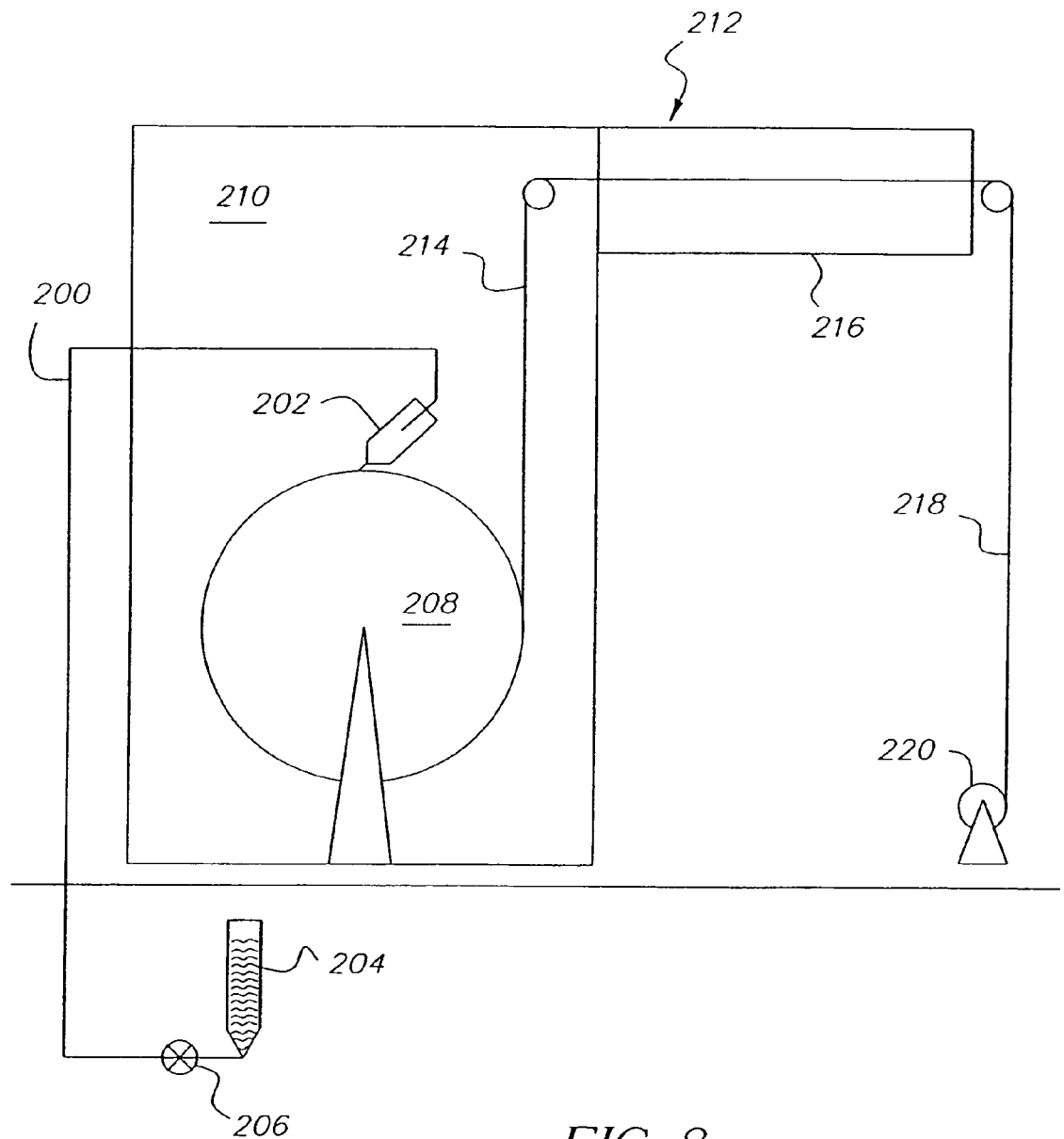
FIG. 8 is a schematic of a casting apparatus as used in prior art to cast cellulose acetate films.

The prior art method of casting resin films is illustrated in FIG. 8. As shown in FIG. 8, a viscous polymeric dope is delivered through a feed line 200 to an extrusion hopper 202 from a pressurized tank 204 by a pump 206. The dope is cast onto a highly polished metal drum 208 located within a first drying section 210 of the drying oven 212. The cast film 214 is allowed to partially dry on the moving drum 208 and is then peeled from the drum 208. The cast film 214 is then conveyed to a final drying section 216 to remove the remaining solvent. The final dried film 218 is then wound into rolls at a wind-up station 220. The prior art cast film typically has a thickness in the range of from 40 to 200 μm.

Coating methods are distinguished from casting methods by the process steps necessary for each technology. These process steps in turn affect a number of tangibles such as fluid viscosity, converting aids, substrates, and hardware that are unique to each method. In general, coating methods involve application of dilute low viscosity liquids to thin flexible substrates, evaporating the solvent in a drying oven, and winding the dried film/substrate composite into rolls. In contrast, casting methods involve applying a concentrated viscous dope to a highly polished metal drum or band, partially drying the wet film on the metal substrate, stripping the partially dried film from the substrate, removing additional solvent from the partially dried film in a drying oven, and winding the dried film into rolls. In terms of viscosity, coating methods require very low viscosity liquids of less than 5,000 cp. In the practice of the method of the present invention the viscosity of the coated liquids will generally be less than 2000 cp and most often less than 1500 cp. Moreover, in the method of the present invention the viscosity of the lowermost layer is preferred to be less than 200 cp. and most preferably less than 100 cp. for high speed coating application. In contrast, casting methods require highly concentrated dopes with viscosity on the order of 10,000-100,000 cp for practical operating speeds. In terms of converting aids, coating methods generally involve the use of surfactants as converting aids to control flow after coating artifacts such as mottle, repellencies, orange peel, and edge withdraw. In contrast, casting methods do not require surfactants. Instead, converting aids are only used to assist in the stripping operation in casting methods. For example, n-butanol is sometimes used as a converting aid in casting cellulose acetate films to facilitate stripping of the cellulose acetate film from the metal drum. In terms of substrates, coating methods generally utilize thin (10-250 μm) flexible supports. In contrast, casting methods employ thick (1-100 mm), continuous, highly polished metal drums or rigid bands. As a result of these differences in process steps, the hardware used in coating is conspicuously different from those used in casting as can be seen by a comparison of the schematics shown in FIGS. 1 and 8, respectively.

The advantages of the present invention are demonstrated by the following practical examples given below. In these examples, the cellulose acetate polymer was the highly substituted type (cellulose triacetate with approximately 58.0-62.5% acetic acid content) with a weight average molecular weight of 228,000 daltons.

EXAMPLE 1

This example describes the single pass formation of an ultra thin cellulose acetate film. The coating apparatus 16 illustrated in FIG. 1 was used to apply four liquid layers to a moving substrate 12, 170 of untreated polyethylene terephthalate (PET) to form a single layer film as illustrated earlier in FIG. 6. The substrate speed was 25 cm/s. All coating fluids were comprised of CTA dissolved in a blend of two solvents (a 1:1 ratio of 1,3-dioxolane:acetone where the ratio is by weight). The lowermost layer 162 had a viscosity of 60 cp. and a wet thickness of 11 μm on the moving substrate 170. The second 164 and third 166 layers each had a viscosity of 860 cp. and bad a combined final wet thickness of 69 μm on the moving substrate 170. The second 164 and third 166 layers also each contained plasticizers (diethyl phthalate) at a concentration of 15% by weight relative to the amount of CTA polymer. In addition, the third layer 166 also contained a fluorinated surfactant (Surflon S8405) at concentration of 0.02%. The uppermost layer 168 had a viscosity of 113 cp. and a wet thickness of 22 μm on the moving substrate 170. The uppermost layer 168 also contained a fluorinated surfactant (Surflon S8405) at a weight percent of 0.20%. Coatings were applied at a temperature of 24° C. The gap between the coating lip 136 and the moving substrate 12 (see FIG. 3) was 200 μm. The pressure differential across the coating bead 146 was adjusted between 0-10 cm of water to establish a uniform coating. The temperature in the drying sections 66 and 68 was 40° C. The temperature in the drying section 70 was 50° C. The temperature in the drying sections 72, 74, 76, 78, 80 was 95° C. The temperature in the drying section 82 was 25° C. The composite of CTA film and PET substrate was wound into rolls. When peeled from the untreated PET substrate, the final dry film had a thickness of 5 μm. The peeled CTA film had a good appearance, was smooth, was free from wrinkles and cockle artifacts, and had an in-plane retardation of less than 1.0 nm. Properties of this cellulose acetate film are summarized in Table I.

EXAMPLE 2

This example describes the single pass formation of a very thin cellulose acetate film. The conditions were identical to those described in Example 1 except that the combined wet thickness of the second and third layers 164 and 166 was increased to 154 µm. The composite of CTA film and PET substrate was wound into rolls. When peeled from the subbed PET substrate, the final dry film had a thickness of 10 µm. The peeled CTA film had a good appearance, was smooth, was free from wrinkles and cockle artifacts, and had an in-plane retardation of less than 1.0 nm. Properties of this cellulose acetate film are summarized in Table I.

EXAMPLE 3

This example describes the single pass formation of a thin cellulose acetate film. The conditions were identical to those described in Example 1 except that the combined wet thickness of the second and third layers 164 and 166 was increased to 324 µm. The composite of CTA film and PET substrate was wound into rolls. When peeled from the subbed PET substrate, the final dry film had a thickness of 20 µm. The CTA film had a good appearance, was smooth, was free from wrinkles and cockle artifacts, and had an in-plane retardation of less than 1.0 nm. Properties of this cellulose acetate film are summarized in Table I.

EXAMPLE 4

This example describes the single pass formation a cellulose acetate film. The conditions were identical to those described in Example 3 except that the combined wet thickness of the second and third layers 164 and 166 was increased to 665 µm. The composite of CTA film and PET substrate was wound into rolls. When peeled from the subbed PET substrate, the final dry film had a thickness of 50 µm. The peeled CTA film had a good appearance, was smooth, was free from wrinkles and cockle artifacts, and had an in-plane retardation of less than 1.0 nm. Properties of this cellulose acetate film are summarized in Table I.

EXAMPLE 5

This example describes the formation of a cellulose acetate film using a two-pass coating operation. The conditions were identical to those described in Example 1 except that the solvent system was changed to a 9:1 ratio of methylene chloride:methanol where ratios are by weight. In addition, the lowermost layer 162 had a viscosity of 66 cp. and a wet thickness of 11 µm on the moving substrate 170. The second 164 and third 166 layers each had a viscosity of 1600 cp. and had a combined final wet thickness of 199 µm on the moving substrate 170. The second 164 and third 166 layers each contained plasticizers (diethyl phthalate) at a concentration of 20% by weight relative to the amount of cellulose acetate polymer. In addition, the third layer 166 also contained a fluorinated surfactant (FC431) at concentration of 0.05%. The uppermost layer 168 had a viscosity of 111 cp. and a wet thickness of 22 µm on the moving substrate 170. The uppermost 1 layer 168 also contained a fluorinated surfactant (FC431) at a weight percent of 0.25%. The composite of CTA film and PET substrate was wound into rolls. The wound composite was then over-coated with the combined wet thickness of the second and third layers at 199 µm. The composite of CTA film and PET substrate was wound into rolls. The final dry film had a thickness of 40 µm. The peeled CTA film was smooth, was free from wrinkles and cockle artifacts, and had an in-plane retardation of less than 1.0 nm. Properties of this cellulose acetate film are summarized in Table I.

EXAMPLE 6

This example describes the formation of a cellulose acetate film using a three-pass coating operation. The conditions were identical to those described in Example 5 except that the wound composite of CTA film and PET support of Example 5 was over-coated with a third and final pass. For this final overcoat, the second 164 and third 166 layers had a combined final wet thickness of 411 µm on the moving substrate 170. The composite of CTA film and PET substrate was wound into rolls. The final dry film had a thickness of 80 µm. The peeled CTA film was smooth, was free from wrinkles and cockle artifacts, and had an in-plane retardation of less than 1.0 nm. Properties of this cellulose acetate film are summarized in Table I.

COMPARATIVE EXAMPLE 1

This example describes defects formed in a cellulose acetate film as a result of poor drying conditions during a single pass operation. The conditions for Comparative Example 1 were identical to those described in Example 5 except that the drying conditions were adjusted such that the temperature in the first three drying zones 66, 68, 70 were decreased to 25° C. In addition, the CTA film was formed with only one pass through the coating machine. When peeled from the subbed PET substrate, the final dry film had a thickness of 20 µm. The peeled cellulose acetate film was of unacceptable quality due to fogging of the film.

COMPARATIVE EXAMPLE 2

This example describes defects formed as a result of poor drying conditions during a single pass operation. The conditions for Comparative Example 2 were identical to those described in Comparative Example 1 except that the drying conditions were adjusted such that the temperature in the first three drying zones 66, 68, 70 was increased to 95° C. When peeled from the subbed PET substrate, the final dry film had a thickness of 20 µm. The peeled cellulose acetate film was of unacceptable quality due to a reticulation pattern in the film as well as to blister artifacts.

COMPARATIVE EXAMPLE 3

This example describes film defects in a single-pass coating operation caused by inappropriate amounts of plasticizers. Comparative Example 3 encompasses 25 different coating experiments. The conditions for Comparative Example 3 were identical to those described in Example 5 except that the level of plasticizers in each of the second 164 and third 166 layers was adjusted to be 0, 5, 10, 20 and 30% diethyl phthalate where the percentage is with respect to the amount of CTA polymer. In addition the wet coverage of the second and third layers was adjusted to produce films having a final dry thickness of 5, 10, 20, 30 and 40 µm in a single-pass operation. For very thin coatings of 5 and 10 µm, dried film samples were of good quality regardless of the level of plasticizers. Thicker cellulose acetate films of 20, 30 and 40 Jim, however, prematurely delaminated from the PET support during the drying operation when no plasticizers were used in the second and third layers. Premature delamination was avoided for 20, 30 and 40 µm CTA films by the use of plasticizers at any level of 5, 10, 20 or 30%. At a level of 30% plasticizers, however, dried CTA films exhibited unacceptable bleeding of plasticizers after several days at ambient conditions. At a level of 30 % plasticizers, this bleeding phenomenon is easily recognized during visual inspection of a dried CTA film by the presence of small oily droplets on the surface. Thus, there appears to be an optimum level of plasticizers in the range of 0 to 30% by weight with respect to the amount of cellulose acetate polymer.

COMPARATIVE EXAMPLE 4

Figure 9:
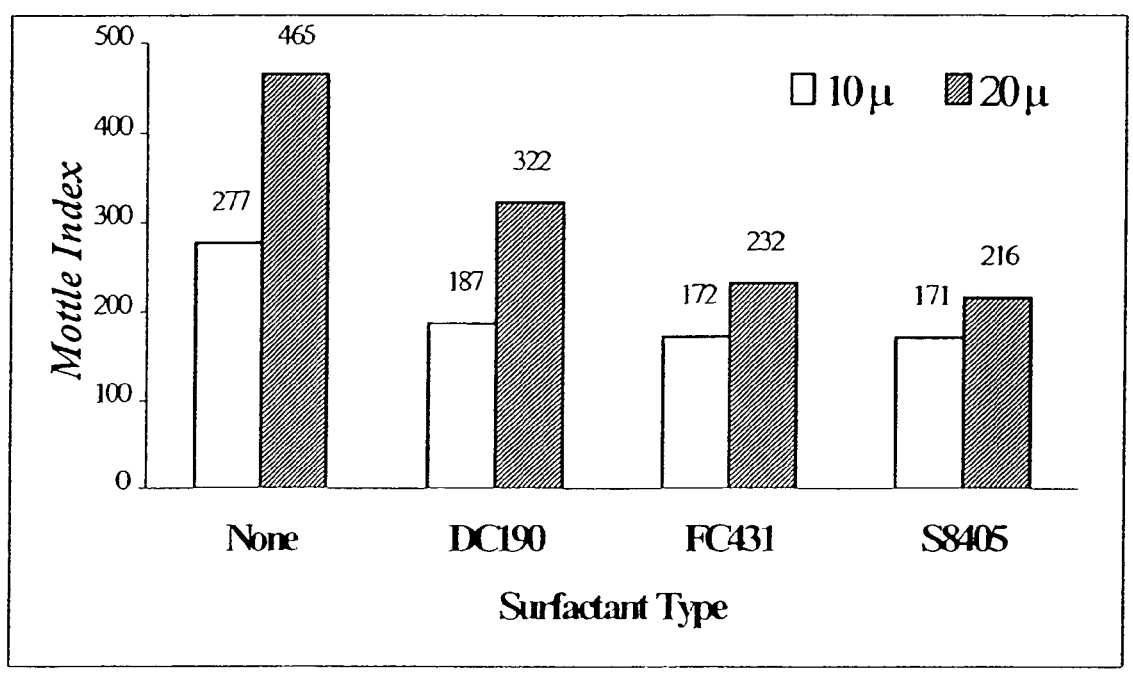
FIG. 9 is a bar graph illustrating the effect of different types of surfactants on the Mottle Index.

This example describes the effect of surfactants on the quality of cellulose acetate films in a single-pass coating operation. The conditions for Comparative Example 4 were identical to those described earlier in Examples 2 and 3 except that the type of surfactant used in the uppermost layer 168 was altered. For these experiments, the surfactant used in the uppermost layer included either a fluorinated compound (Surflon S8405, FC431, or Zonyl FSN), a siloxane compound (DC190), or none as noted. When present, surfactants were used at a level of 0.20% by weight. In addition, a dye (Sudan Black) was added to the uppermost layer 168 at a concentration of 1% by weight in order to highlight nonuniformities in the final cellulose acetate film. The final dyed CTA films had a dry thickness of either 10 or 20 μm as noted. All samples prepared with Zonyl FSN as the surfactant were grossly defective due to repellency artifacts. The remaining films did not exhibit gross nonuniformities and were evaluated for mottle nonuniformity by measurement of a Mottle Index for each sample. The Mottle Index is a quantitative measure of mottle nonuniformity with higher values indicating more severe nonuniformity. FIG. 9 summarizes the results. As shown in FIG. 9, thicker films of 20 μm generally have higher levels of mottle nonuniformity when compared to thinner films of only 10 μm. For example, 10 and 20 μm CTA films prepared without surfactant have a Mottle Index of 277 and 465, respectively. Surfactants were found to reduce mottle severity, and fluorinated surfactants were most effective. For example, 10 and 20 μm cellulose acetate films prepared with the fluorinated surfactant, Surflon S8405, have a Mottle Index of only 172 and 216, respectively. Thus, surfactants are shown here to substantially improve the overall uniformity of the coated cellulose acetate films. This example illustrates an optimization process for choosing an effective surfactant for the method of the present invention. This same strategy may also be employed to select optimum levels of surfactant.

TABLE I

| Example | Thickness | Retardation | Transmittance | Haze | Roughness |
|---|---|---|---|---|---|
| 1 | 5 μm | 0.1 nm | 94.7% | 0.3% | 2.0 nm |
| 2 | 10 | 0.1 | 94.8 | 0.4 | 1.1 |
| 3 | 20 | 0.1 | 94.7 | 0.3 | 0.6 |
| 4 | 50 | 0.2 | 94.1 | 0.6 | 1.3 |
| 5 | 40 | 0.2 | 94.6 | 0.4 | 1.2 |
| 6 | 80 | 0.1 | 94.3 | 0.6 | 1.3 |

The following tests were used to determine the film properties given in Table 1.

Thickness. Thickness of the final peeled film was measured in microns using a Model EG-225 gauge from the Ono Sokki Company.

Retardation. In-plane retardation ($R_e$) of peeled films were determined in nanometers (nm) using a Woollam M-2000V Spectroscopic Ellipsometer at wavelengths from 370 to 1000 nm. In-plane retardation values in Table I are computed for measurements taken at 590 nm. In-plane retardation is defined by the formula:

$$R_e = |n_x - n_y| \times d$$

where $R_e$ is the in-plane retardation at 590 nm, $n_x$ is the index of refraction of the peeled film in the slow axis direction, $n_y$ is the is the index of refraction of the peeled film in the fast axis direction, and d is the thickness of the peeled film in nanometers (nm). Thus, $R_e$ is the absolute value of the difference in birefringence between the slow axis direction and the fast axis direction in the plane of the peeled film multiplied by the thickness of the film.

Transmittance and Haze. Total transmittance and haze are measured using the Haze-Gard Plus (Model HB-4725) from BYK-Gardner. Total transmittance is all the light energy transmitted through the film as absorbed on an integrating sphere. Transmitted haze is all light energy scattered beyond 2.5° as absorbed on an integrating sphere.

Mottle Index. Mottle levels are characterized in dyed samples using the MTI Mottle Tester from Tobias Associates. This device is a reflectance densitometer with the capability of scanning 500 sample areas (1.5 mm in diameter) per scan. Twenty scans are performed for each sample. Sample size is 5×20 cm. For these samples, the measured Mottle Index is consistent with visual observations of the films.

Surface Roughness. Surface roughness was determined in nanometers (nm) by scanning probe microscopy using TappingMode™ Atomic Force Microscopy (Model D300 from Digital Instruments).

Adhesion. The adhesion strength of the coated samples was measured in Newtons per meter (N/m) using a modified 180° peel test with an Instron 1122 Tensile Tester with a 500 gram load cell. First, 0.0254 m (one inch) wide strips of the coated sample were prepared. Delamination of the coating at one end was initiated using a piece of 3M Magic Tape. An additional piece of tape was then attached to the delaminated part of the coating and served as the gripping point for testing. The extending tape was long enough to extend beyond the support such that the Instron grips did not interfere with the testing. The sample was then mounted into the Instron 1122 Tensile Tester with the substrate clamped tin the upper grip and the coating/tape assembly clamped in the bottom grip. The average force (in units of Newtons) required to peel the coating off the substrate at a 180° angle at speed of 2 inches/min (50.8 mm/min) was recorded. Using this force value the adhesive strength in units of N/m was calculated using the equation:

$$S_A = F_p (1 - \cos \theta)/w$$

wherein $S_A$ is the adhesive strength, $F_p$ is the peel force, $\theta$ is the angle of peel (180°), and w is the width of the sample (0.0254 m).

Residual Solvent A qualitative assessment of residual solvents remaining in a dried film is done by first peeling the film from the carrier substrate, weighing the peeled film, incubating the film in an oven at 100° C. for 16 hours, and finally weighing the incubated film. Residual solvent is expressed as percentage of the weight difference divided by the post-incubation weight.

From the foregoing, it will be seen that this invention is one well adapted to obtain all of the ends and objects hereinabove set forth together with other advantages which are apparent and which are inherent to the apparatus.

It will be understood that certain features and sub-combinations are of utility and may be employed with reference to other features and sub-combinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST:

- 10 drying system
- 12 moving substrate/web
- 14 dryer
- 16 coating apparatus
- 18 unwinding station
- 20 back-up roller
- 22 coated web
- 24 dry film
- 26 wind up station
- 28 coating supply vessel
- 30 coating supply vessel
- 32 coating supply vessel
- 34 coating supply vessel
- 36 pumps
- 38 pumps
- 40 pumps
- 42 pumps
- 44 conduits
- 46 conduits
- 48 conduits
- 50 conduits
- 52 discharge device
- 54 polar charge assist device
- 56 opposing rollers
- 58 opposing rollers
- 60 cellulose acetate film
- 62 winding station
- 64 winding station
- 66 drying section
- 68 drying section
- 70 drying section
- 72 drying section
- 74 drying section
- 76 drying section
- 78 drying section
- 80 drying section
- 82 drying section
- 92 front section
- 94 second section
- 96 third section
- 98 fourth section
- 100 back plate
- 102 inlet
- 104 metering slot
- 106 pump
- 108 lower most layer
- 110 inlet
- 112 $2^{nd}$ metering slot
- 114 pump
- 116 layer
- 118 inlet
- 120 metering slot
- 122 pump
- 124 form layer
- 126 inlet
- 128 metering slot
- 130 pump
- 132 layer
- 134 incline slide surface
- 136 coating lip
- 138 $2^{nd}$ incline slide surface
- 140 $3^{rd}$ incline slide surface
- 142 $4^{th}$ incline slide surface
- 144 back land surface
- 146 coating bead
- 150 cellulose acetate film -continued

PARTS LIST:

- 152 carrier substrate
- 154 carrier substrate
- 156 subbing layer
- 158 cellulose acetate film
- 160 multiple layer film
- 162 lower most layer
- 164 intermediate layers
- 166 intermediate layers
- 168 upper most layer
- 170 carrier support
- 172 composite film
- 174 lower most layer
- 176 intermediate layers
- 178 intermediate layers
- 180 upper most layers
- 182 carrier substrate
- 184 subbing layer
- 200 feed line
- 202 extrusion hopper
- 204 pressurized tank
- 206 pump
- 208 metal drum
- 210 drying section
- 212 drying oven
- 214 cast film
- 216 final drying section
- 218 final dried film
- 220 wind up station

What is claimed is:

1. A composite film comprising:
a cellulose acetate film coated on a discontinuous carrier substrate, the cellulose acetate film having a thickness in the range of from about 1 to about 500 μm, the cellulose acetate film having an in-plane retardation that is less than 10 nm, the cellulose acetate film being adhered to the carrier substrate with an adhesive strength of less than about 250 N/m.

2. A composite film as recited in claim 1 wherein:
the cellulose acetate film has an in-plane retardation that is less than 5 nm.

3. A composite film as recited in claim 1 wherein:
the cellulose acetate film has an in-plane retardation that is less than 1.0 nm.

4. A composite film as recited in claim 1 wherein:
the cellulose acetate film is adhered to the carrier substrate with an adhesive strength of at least about 0.3 N/m.

5. A composite film as recited in claim 1 wherein:
the cellulose acetate film is peelable from the carrier substrate.

6. A composite film as recited in claim 1 wherein:
the cellulose acetate film is a multi-layer composite.

7. A composite film as recited in claim 6 wherein:
at least a top layer of the multi-layer composite includes a surfactant therein.

8. A composite film as recited in claim 1 wherein:
a plasticizer is incorporated in the cellulose acetate film.

9. A composite film as recited in claim 1 wherein:
the cellulose acetate film has a light transmittance of at least about 85 percent and a haze value of less than about 1.0 percent.

* * * * *